United States Patent
Kane et al.

(10) Patent No.: US 11,498,760 B2
(45) Date of Patent: Nov. 15, 2022

(54) DEPLOYABLE AND RETRIEVABLE SECTION DIVIDERS

(71) Applicant: INTERNATIONAL BUSINESS MACHINES CORPORATION, Armonk, NY (US)

(72) Inventors: Michael Kane, Hopewell Junction, NY (US); Colin Edward Masterson, Rochester, MN (US); Jacob Porter, Highland, NY (US); Marie Cole, Poughkeepsie, NY (US); Suraush Khambati, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 876 days.

(21) Appl. No.: 16/391,365

(22) Filed: Apr. 23, 2019

(65) Prior Publication Data
US 2020/0339352 A1    Oct. 29, 2020

(51) Int. Cl.
  *B65G 1/10*    (2006.01)
  *E01F 7/00*    (2006.01)
  *E01F 13/02*   (2006.01)
(52) U.S. Cl.
  CPC .................. *B65G 1/10* (2013.01); *E01F 7/00* (2013.01); *E01F 13/02* (2013.01)
(58) Field of Classification Search
  CPC ... E01F 9/70; E01F 9/646; E01F 9/688; E01F 9/692; E01F 13/02; E01F 13/022;
  (Continued)

(56) References Cited

U.S. PATENT DOCUMENTS

| 4,124,196 A | 11/1978 | Hipskind |
| 4,370,088 A * | 1/1983 | McShane ............... B60P 3/00 414/439 |

(Continued)

FOREIGN PATENT DOCUMENTS

| CH | 618136 A5 * | 7/1980 |
| DE | 4212224 A1 | 10/1993 |

(Continued)

OTHER PUBLICATIONS

Delta Scientific, "Delta Scientific MP5000 Portable Crash Barriers Used during Pope's U.S. Visit", Oct. 8, 2015, pp. 1-2.
(Continued)

*Primary Examiner* — Jonathan P Masinick
(74) *Attorney, Agent, or Firm* — Tihon Poltavets

(57) ABSTRACT

An apparatus for deployment and retrieval of section dividers includes a frame, a deployment rail, a first section divider carrier rail, and a second section divider carrier rail. The structure includes a first end of the first section divider carrier rail coupled to a first end of the deployment rail and a first end of the second section divider carrier rail coupled to a second of the deployment rail. A first actuator coupled to the first end of the first section divider carrier rail. A second actuator coupled to the second end of the first section divider carrier rail. The structure further includes a first deployment and retrieval system coupled to the first section divider carrier rail, wherein the first deployment and retrieval system guides a first retrieval body at a first end of a first section divider from the deployment rail to the first section divider carrier rail.

20 Claims, 6 Drawing Sheets

(58) Field of Classification Search
CPC ...... E01F 13/028; E04H 17/18; E04H 17/185; B65G 1/10; B65G 1/026
See application file for complete search history.

(56) References Cited

U.S. PATENT DOCUMENTS

| | | | | |
|---|---|---|---|---|
| 5,213,312 | A * | 5/1993 | MacDonald | E01F 13/022 256/73 |
| 5,269,623 | A | 12/1993 | Hanson | |
| 5,484,137 | A * | 1/1996 | Smith | E01F 9/70 116/202 |
| 5,745,947 | A * | 5/1998 | Liu | E01H 1/106 15/82 |
| 6,036,249 | A | 3/2000 | Kuntz | |
| 6,257,559 | B1 * | 7/2001 | Mouri | E01F 9/70 256/25 |
| 7,109,885 | B1 * | 9/2006 | Denlinger | E01F 7/00 116/63 P |
| 7,600,554 | B1 | 10/2009 | Wright et al. | |
| 8,711,004 | B2 | 4/2014 | Gabara et al. | |
| 8,813,455 | B2 * | 8/2014 | Merrifield | E04C 3/02 52/645 |
| 9,096,978 | B2 | 8/2015 | Carlson | |
| 9,771,695 | B2 * | 9/2017 | Betson | E01F 9/70 |
| 9,844,204 | B2 * | 12/2017 | Schwartz | A01K 3/00 |
| 9,908,465 | B2 | 3/2018 | Allison | |
| 2006/0249091 | A1 | 11/2006 | Orbach | |
| 2013/0048227 | A1 | 2/2013 | Cannova | |

FOREIGN PATENT DOCUMENTS

| | | | | |
|---|---|---|---|---|
| DE | 202017106208 U1 * | 11/2017 | | |
| FR | 2264683 A1 * | 10/1975 | | |
| FR | 2614770 A1 * | 11/1988 | | |
| FR | 2688244 A1 * | 9/1993 | | E01F 13/00 |
| WO | WO-0032877 A1 * | 6/2000 | | E01F 9/70 |
| WO | WO-2009121468 A1 * | 10/2009 | | E01F 13/022 |

OTHER PUBLICATIONS

Motorway—Axi-Shield Rapid Deployment, "Motorway Incident Screen", http://axi-shield.com/motorway/, printed Apr. 22, 2019, pp. 1-4.
https://webarchive.nationalarchives.gov.uk/20110606094826/ http: . . . ,"Welcome to the Highways Agency", Archived on Jun. 6, 2011, printed Apr. 23, 2019, pp. 1-2.
Configurations—SRN, Inc., https://srn1000.com/, "SRN System Configurations", printed Apr. 22, 2019, pp. 1-5.

* cited by examiner

_US 11,498,760 B2_

DEPLOYABLE AND RETRIEVABLE SECTION DIVIDERS

FIELD OF THE INVENTION

This disclosure relates generally to sectioned dividers, and in particular, to an apparatus for deploying and retrieving section dividers.

BACKGROUND OF THE INVENTION

Freestanding section dividers are utilized in various functions including sporting events, traffic events, or any situation requiring a separation of two or more areas (e.g., security at an airport terminal). Typically, freestanding section dividers are manually deployed, where an individual has to physically transfer each section divider from a transport vehicle onto a surface at a location where the freestanding section divider is required. Further complicating this manual deployment of freestanding section dividers is the task of coupling one freestanding section divider to another, where each freestanding section divider is manually aligned and coupled by the individual. Retrieval of the freestanding section dividers also requires manual involvement from the individual to decouple each freestanding section divider and load each freestanding section divider onto the transport vehicle.

SUMMARY

One aspect of an embodiment of the present invention discloses an apparatus for deployment and retrieval of section dividers, the structure comprising: a frame, a deployment rail, a first section divider carrier rail, and a second section divider carrier rail; a first end of the first section divider carrier rail coupled to a first end of the deployment rail and a first end of the second section divider carrier rail coupled to a second of the deployment rail, wherein the first end of the deployment rail is opposite the second end of the deployment rail; a first actuator coupled to the first end of the first section divider carrier rail and a first portion of the frame; a second actuator coupled to the second end of the first section divider carrier rail and a second portion of the frame; and a first deployment and retrieval system coupled to the first section divider carrier rail, wherein the first deployment and retrieval system guides a first retrieval body at a first end of a first section divider from the deployment rail to the first section divider carrier rail.

BRIEF DESCRIPTION OF THE SEVERAL VIEWS OF THE DRAWINGS

The following detailed description, given by way of example and not intended to limit the disclosure solely thereto, will best be appreciated in conjunction with the accompanying drawings, in which.

DETAILED DESCRIPTION

Figure 1A:
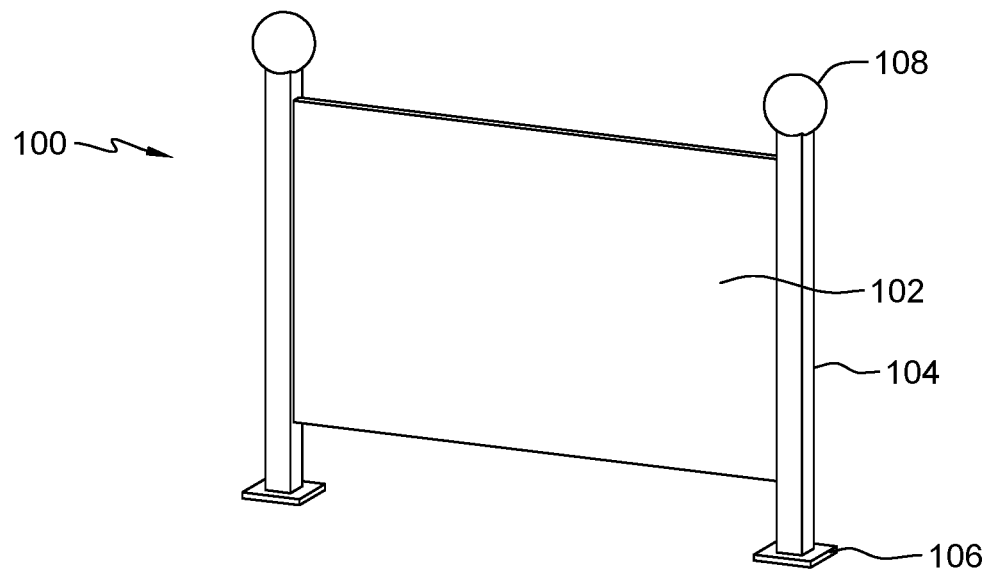
FIG. 1A depicts a section divider, in accordance with an embodiment of the present invention.

Embodiments of the present invention provide a structure for deploying and retrieving freestanding section dividers. The structure provides section dividers, storage for the section dividers, and deployment and retrieval rail system enclosed in a single support chassis that is loadable unto a transport vehicle or trailer connected to the transport vehicle. The deployment and retrieval rail system is coupled to the support chassis, where the deployment and retrieval rail system allows for the section dividers to slide and lock into place within the support chassis. A deployment rail orientated along a length of the transport vehicle (i.e., parallel to the transport vehicle) is extendable out of the support chassis in an x-axis and y-axis direction for deployment and retrieval of section dividers. The deployment rail includes a latch point to lock section dividers into place until the section divider can slide along section divider carrier rail for storage within the bounds of the support chassis.

A first set of actuators are integrated into the support chassis coupled to the deployment and retrieval rail system, and a second set of actuators are integrated into each section divider carrier rail to allow for the lifting and sliding of the section dividers onto a surface from the support chassis. The first set of actuators also allow for the section dividers to be lifted over a support base on the transport vehicle. One or more electrical, hydraulic, and/or pneumatic distribution systems are utilized for the actuators, rails, and latches.

Detailed embodiments of the present invention are disclosed herein with reference to the accompanying drawings; however, it is to be understood that the disclosed embodiments are merely illustrative of potential embodiments of the invention and may take various forms. In addition, each of the examples given in connection with the various embodiments is also intended to be illustrative, and not restrictive. This description is intended to be interpreted merely as a representative basis for teaching one skilled in the art to variously employ the various aspects of the present disclosure. In the description, details of well-known features and techniques may be omitted to avoid unnecessarily obscuring the presented embodiments.

For purposes of the description hereinafter, terms such as "upper", "lower", "right", "left", "vertical", "horizontal", "top", "bottom", and derivatives thereof shall relate to the disclosed structures and methods, as oriented in the drawing figures. Terms such as "above", "overlying", "atop", "on top", "positioned on" or "positioned atop" mean that a first element, such as a first structure or first member, is present on a second element, such as a second structure or second member, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements. The term substantially, or substantially similar, refer to instances in which the difference in length, height, or orientation convey no practical difference between the definite recitation (e.g. the phrase sans the substantially similar term), and the substantially similar variations. In one embodiment, substantial (and its derivatives) denote a difference by a generally accepted engineering or manufacturing tolerance for similar devices, up to, for example, 10% deviation in value or 10° deviation in angle.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

FIG. 1A depicts a section divider, in accordance with an embodiment of the present invention. Section divider 100 includes wall portion 102 positioned between two pillars 104, where wall portion 102 is a rigid structure. A rigid wall portion 102 can be constructed utilizing a lightweight alloy (e.g., aluminum) or a composite, such as reinforced plastics or ceramics. In other embodiments, wall portion 102 is a flexible structure. Each pillar 104 of section divider 100 includes base 106 position at a first end, where the combination of both bases 106 allow for section divider 100 to remain in an upright position. Each pillar 104 can be constructed utilizing steel, alloys, wood, plastic, or composites. For each base 106 of section divider 100, a weight and a surface area of a bottom portion of base 106 is based on an amount of support needed for section divider 100 to remain in the upright position during various wind conditions. Section divider 100 can also include one or more apertures in wall portion 102 to allow for a portion of air to flow through section divider 100, relieving base 106 of a portion of torque experienced due to the various wind conditions.

Each pillar 104 of section divider 100 includes retrieval body 108 positioned at a second end, to allow for support chassis 200 and deployment and retrieval system 400 to deploy and retrieve section divider 100 via the two retrieval bodies 108. Support chassis 200 and deployment and retrieval system 400 are discussed in further detail with regards to FIGS. 2A and 4A. In this embodiment, retrieval body 108 is spherical in shape but in other embodiments, retrieval body 108 can be any shape to allow for rapid deployment and retrieval by deployment and retrieval system 400. The combination of both retrieval bodies 108 supports a weight of section divider 100, where section divider 100 can be suspended by both retrieval bodies 108, discussed in further detail with regards to FIG. 1C. A weight and volume of each retrieval body 108 is based on a weight of section divider 100 and a clamp type utilized by deployment and retrieval system 400 to temporarily couple to each retrieval body 108 of section divider 100.

Figure 1B:
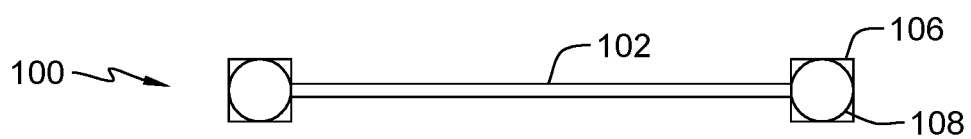
FIG. 1B depicts a top view of the section divider of FIG. 1A, in accordance with an embodiment of the present invention.

FIG. 1B depicts a top view of the section divider of FIG. 1A, in accordance with an embodiment of the present invention. As previously discussed, wall portion 102 of section divider 100 is either rigid or flexible. For a flexible wall portion 102, FIG. 1B illustrates wall portion 102 in an extended state. In this embodiment, a width or length of base 106 is equal to a diameter of retrieval body 108. However, as previously discussed dimensions of either base 106 or retrieval body 108 is dependent on an application and various characteristics of section divider 100 (e.g., weight, height, materials etc.).

Figure 1C:
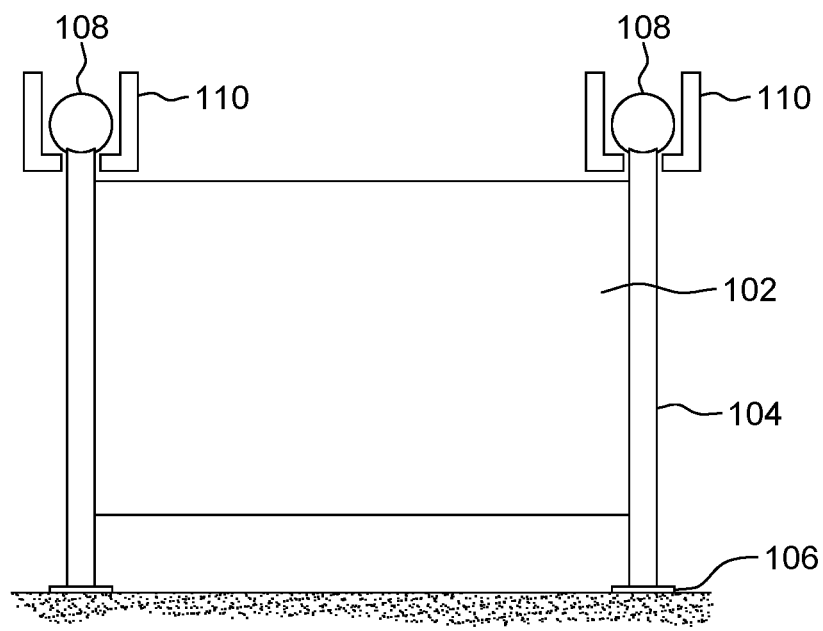
FIG. 1C depicts a side view of the section divider of FIG. 1A, in accordance with an embodiment of the present invention.

FIG. 1C depicts a side view of the section divider of FIG. 1A, in accordance with an embodiment of the present invention. In this embodiment, section divider 100 with wall portion 102 is disposed on a road surface, where each base 106 located on a first end of pillar 104 allows for section divider 100 to stand in an upright position on the road surface. Storage guide rails 110 illustrate how each retrieval body 108 located on a second end of pillar 104 can support a weight of section divider 100, where section divider 100 becomes suspended by both retrieval bodies 108 when storage guide rails 110 are moved in an upward motion. As storage guide rails 110 are moved in an upward motion, a portion of each retrieval body 108 is disposed onto a portion of each storage guide rail 110 allowing for section divider 100 to become suspended by each retrieval body 108.

Figure 1D:
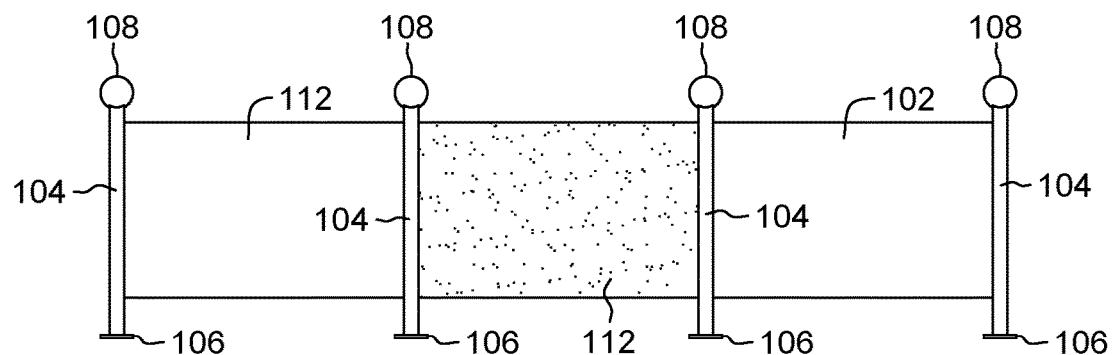
FIG. 1D depicts a side view of a single flexible section divider and two rigid section dividers, in accordance with an embodiment of the present invention.

FIG. 1D depicts a side view of a single flexible section divider and two rigid section dividers, in accordance with an embodiment of the present invention. In this embodiment, multiple section dividers 100 are coupled in an interchanging variation of flexible section dividers and rigid section dividers. Flexible wall portion 112 is disposed between two rigid wall portions 102, where pillar 104 can be shared between both rigid wall portion 102 and flexible wall portion 112. As previously discussed, rigid wall portion 102 can be constructed utilizing a lightweight alloy (e.g., aluminum) or a composite, such as reinforced plastics or ceramics. Flexible wall portion 112 can be constructed utilizing a woven plastic mesh or any material capable of folding or consolidating depending on a position of each pillar 104. Rigid wall portion 102 and flexible wall portion 112 are each coupled to pillar 104 in manner that allows for 360° movement about the y-axis of pillar 104. As a result, rigid wall portion 102 and flexible wall portion 112 can be deployed in a non-linear manner onto a surface (e.g., 90° turn.

In this embodiment, three section dividers 100 are coupled to four pillars 104, where two of the outboard pillars 104 are coupled to rigid wall portion 102 and two of the inward pillars 104 are coupled to both, rigid wall portion 102 and flexible wall portion 112. Each pillar 104 includes base 106 at a first end for supporting the three section dividers 100 and retrieval body 108 at a second end for deployment and retrieval by deployment and retrieval system 400. An orientation of multiple section dividers 100 in deployment and retrieval system 400 are discussed in further detail with regards to FIG. 1E.

Figure 1E:
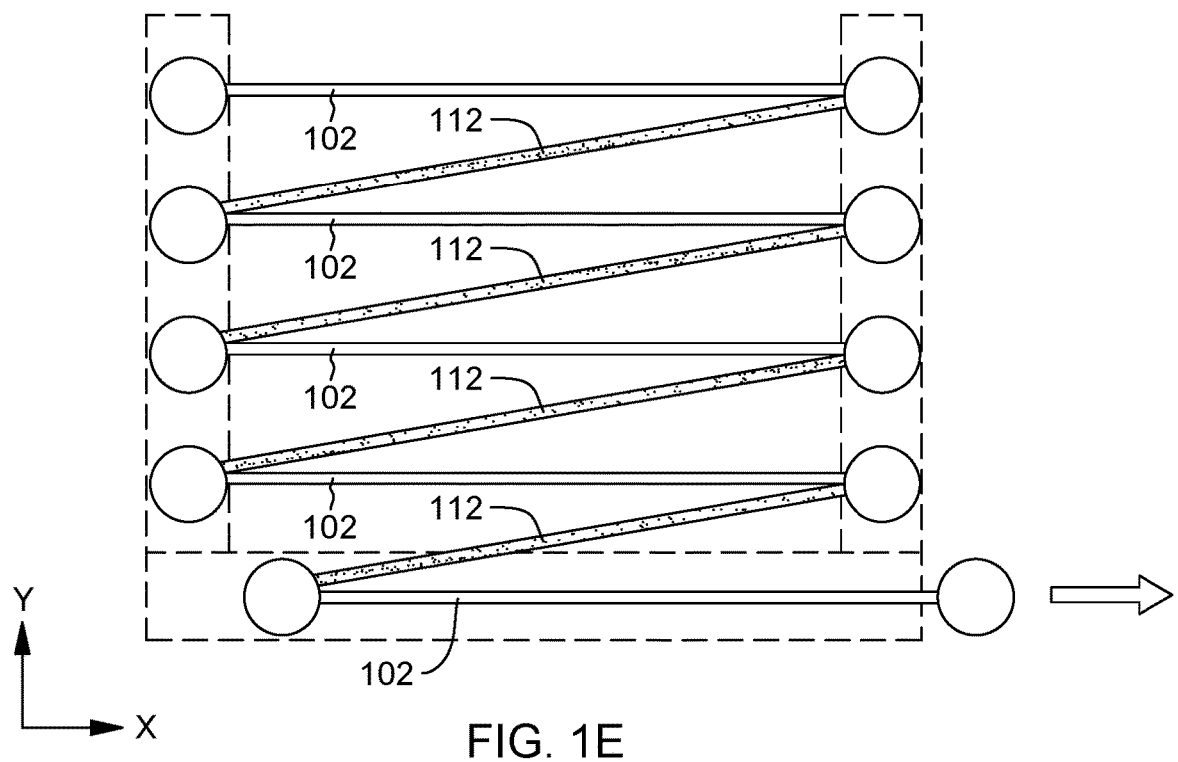
FIG. 1E depicts a top view of multiple flexible and rigid section dividers in a stored configuration, in accordance with an embodiment of the present invention.

FIG. 1E depicts a top view of multiple flexible and rigid section dividers in a stored configuration, in accordance with an embodiment of the present invention. In this embodiment, an interchanging variation of rigid wall portion 102 and flexible wall portion 112 allows for the multiple section dividers to be stored in a collapsed manner in deployment and retrieval system 400. As a first rigid section divider with rigid wall portion 102 is deployed by deployment and retrieval system 400, the first section divider pulls the section divider out of deployment and retrieval system 400. The interchanging variation of rigid wall portion 102 and flexible wall portion 112 allow for flexible wall portion 112 to temporarily collapse as the section divider with rigid wall portion 102 is deployed. In another embodiment, flexible wall portion 112 has the ability to retract into the pillar via a spring loaded structure as the section divider with rigid wall portion 102 is deployed. The spring loaded structure for the flexible wall portion 112 prevents flexible wall portion 112 from interfering with the deployment of the section dividers. In this embodiment, each rigid wall portion 102 and flexible wall portion 112 is three meters long and a total length of the interconnected rigid wall portion 102 and flexible wall portion 112 is 27 meters long. An amount of interconnected rigid wall portions 102 and flexible wall portions 112 is dependent on a size of support chassis 200, where support chassis 200 is discussed in further detail with regards to FIG. 2A.

Figure 2A:
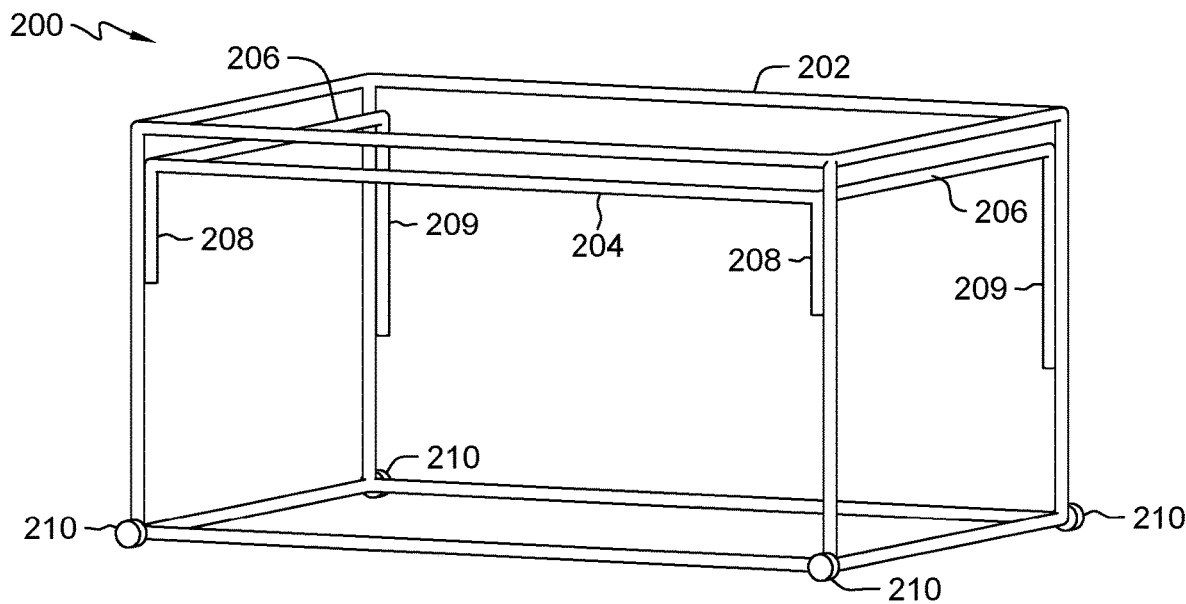
FIG. 2A depicts a support chassis in a retracted state for storing multiple flexible and rigid section dividers, in accordance with one embodiment of the present invention.

FIG. 2A depicts a support chassis in a retracted state for storing multiple flexible and rigid section dividers, in accordance with one embodiment of the present invention. Support chassis 200 includes a rectangular shaped frame 202 with deployment rail 204 that is extendable and retractable via section divider carrier rail 206 positioned at each end of deployment rail 204. In this embodiment, section divider carrier rails 206 are in a retracted state, where deployment rail 204 is retracted into frame 202 of support chassis 200. Deployment rail 204 and section divider carrier rail 206 are coupled to frame 202 via front actuators 208 and rear actuators 209, where each of front actuators 208 and rear actuators 209 have the ability to compress and extend in the y-axis direction. One or more casters 210 are coupled to each corner of a lower portion of frame 202 of support chassis 200 to allow for movement of support chassis 200 between a transport vehicle and a storage location.

Figure 2B:
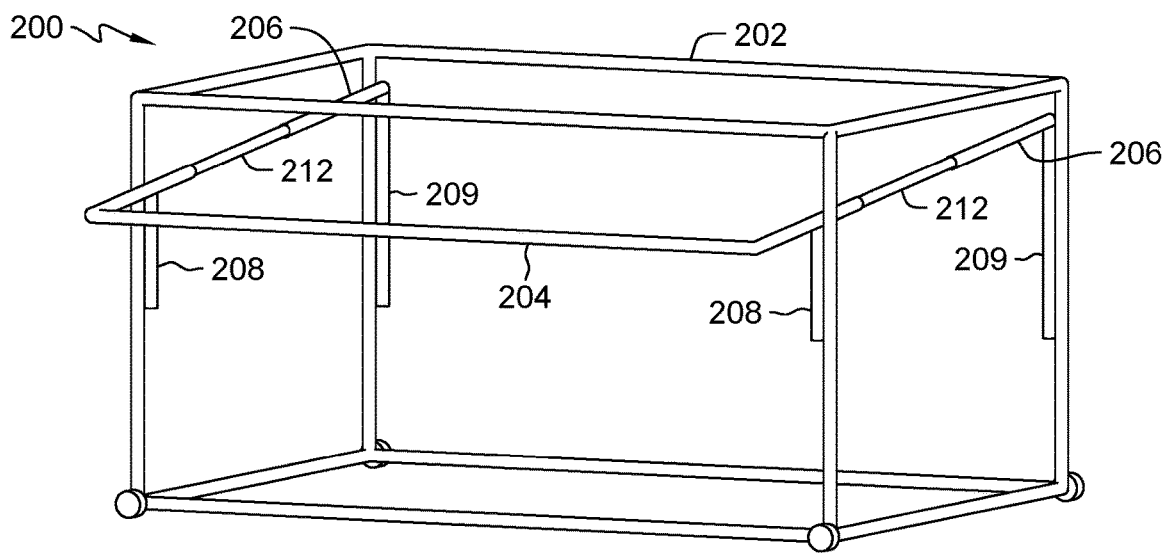
FIG. 2B depicts a support chassis in an extended state for deploying and retrieving multiple flexible and rigid section dividers, in accordance with one embodiment of the present invention.

FIG. 2B depicts a support chassis in an extended state for deploying and retrieving multiple flexible and rigid section dividers, in accordance with one embodiment of the present invention. In this embodiment, section divider carrier rails 206 are in an extended state, where deployment rail 204 is extended out of frame 202 of support chassis 200. Rail extension 212 disposed inside each section divider carrier rail 206 allows for deployment rail 204 to extend beyond the bounds of frame 202. As front actuators 208 compress and rear actuators 209 extend in the y-axis direction, deployment rail 204 extends beyond the bounds of frame 202 and rail extensions 212 extend out of section divider carrier rails 206. In another embodiment, section divider carrier rails 206 include an additional actuator motor for extending deployment rail 204 beyond the bounds of frame 202.

Figure 3A:
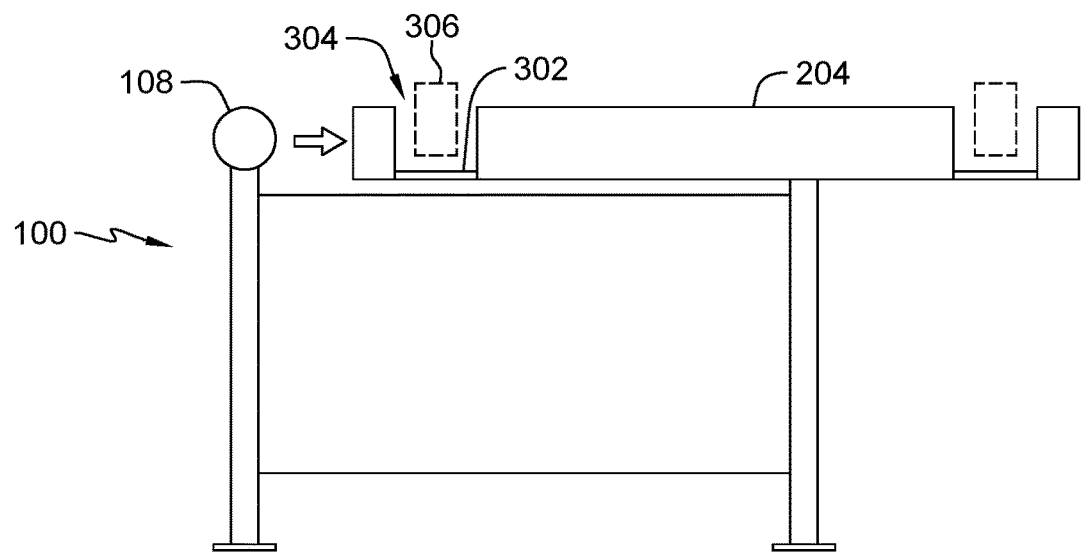
FIG. 3A depicts a section divider partially retrieved by a deployment and retrieval rail of a support chassis, in accordance with one embodiment of the present invention.

FIG. 3A depicts a section divider partially retrieved by a deployment rail of a support chassis, in accordance with one embodiment of the present invention. In this embodiment, section divider 100 is being retrieved by deployment and retrieval system 400, where a first retrieval body 108 of section divider 100 enters (i.e., placeable on) a guide path of deployment rail 204. The guide path of deployment rail 204 includes platform 302 upon which retrieval body 108 of section divider 100 can rest and/or guide section divider 100 into deployment rail 204. Deployment rail 204 further includes cutout 304 for section guide 306 to receive retrieval body 108 of section divider 100. Dimensions of cutout 304 are such that retrieval body 108 can pass through cutout 304 upon section guide 306 contacting retrieval body 108.

Figure 3B:
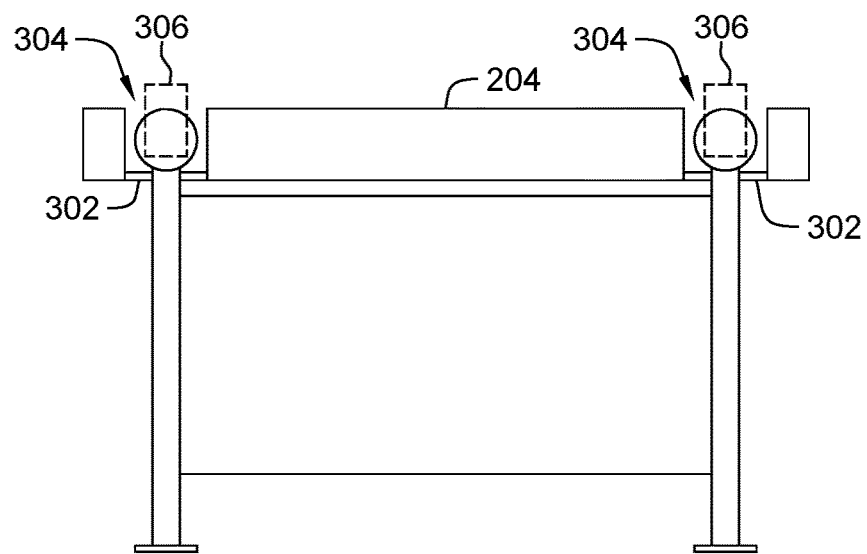
FIG. 3B depicts a section divider retrieved by a deployment and retrieval rail of a support chassis, in accordance with one embodiment of the present invention.

FIG. 3B depicts a section divider retrieved by a deployment rail of a support chassis, in accordance with one embodiment of the present invention. In this embodiment, section divider 100 is being retrieved by deployment and retrieval system 400, where a first and a second retrieval body 108 of section divider 100 are disposed in a guide path of deployment rail 204. As previously discussed, deployment rail 204 further includes two cutouts 304 for two section guides 306 to each receive retrieval body 108 of section divider 100.

Figure 3C:
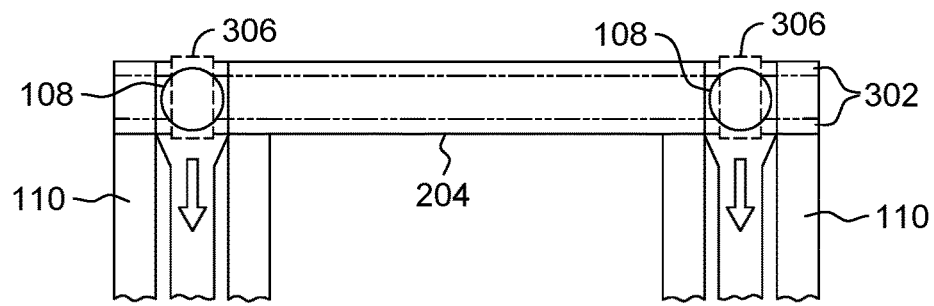
FIG. 3C depicts a top view of a section divider retrieved by a deployment and retrieval rail of a support chassis, in accordance with one embodiment of the present invention.

FIG. 3C depicts a top view of a section divider retrieved by a deployment rail of a support chassis, in accordance with one embodiment of the present invention. As discussed with regards to FIG. 3B, a first and a second retrieval body 108 of section divider 100 are placeable in a guide path on platform 302 of deployment rail 204. Section guides 306 direct section divider 100 towards storage guide rail 110 by applying a force to each of the two retrieval bodies 108 of section divider 100 and forcing each of the two retrieval bodies through the respective cutout 304. In summary, with respect to FIG. 3C as illustrated, section divider 100 enters deployment rail 204 in the positive x-axis direction (i.e., right direction), the force applied by section guides 306 directs section divider 100 in the negative y-axis (i.e., down direction) direction towards storage guide rails 110.

Figure 4A:
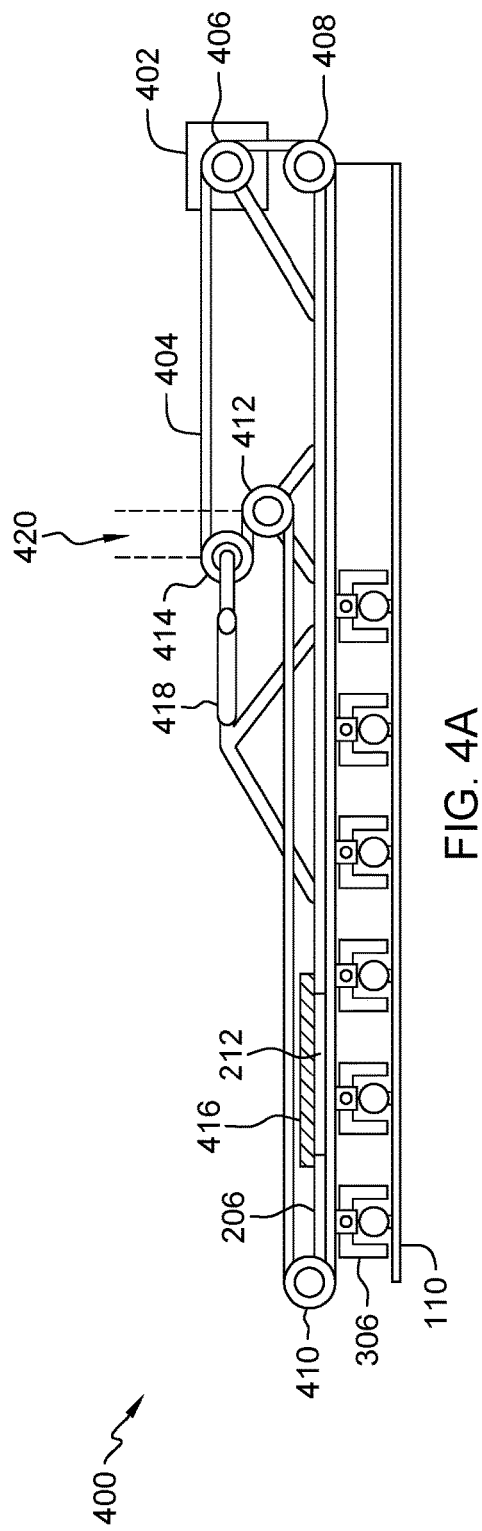
FIG. 4A depicts a side view of a deployment and retrieval system of a support chassis in an extended state, in accordance with one embodiment of the present invention.

FIG. 4A depicts a side view of a deployment and retrieval system of a support chassis in an extended state, in accordance with one embodiment of the present invention. FIG. 4A represents a detailed example of deployment and retrieval system 400 previously discussed and simplified in FIGS. 1A, 1D, 1E, 3A, and 3B. Deployment and retrieval system 400 includes storage guide rail 110, where retrieval body 108 of each section divider 100 is disposed on storage guide rail 110 when being stored. As previously discussed, section guides 306 force retrieval body 108 along storage guide rail 110 when each section divider 100 is stored by deployment and retrieval system 400. Motor drive 402 of deployment and retrieval system 400 allows for a plurality of pulleys and linkage 404 to work in unison to move each section divider 100 along storage guide rail 110, where each section guide 306 is coupled to linkage 404. Linkage 404 can be a belt driven or chain driven depending on application and maintenance requirements.

For deploying section dividers 100, deployment and retrieval system 400 forces section dividers in a negative x-axis (i.e., left direction) direction along storage guide rail 110. As motor drive 402 rotates in a clockwise direction, first pulley 406 coupled to motor drive 402 rotates linkage 404 resulting in second pulley 408 rotating in a clockwise direction. Linkage 404 translates the rotational force from second pulley 408 to third pulley 410, where third pulley 410 rotates in a clockwise direction. Linkage 404 translates the rotational force from third pulley 410 to fourth pulley 412, where fourth pulley 412 rotates in a counterclockwise direction. Linkage 404 translates the rotational force from fourth pulley 412 to fifth pulley 414, where fifth pulley 414 rotates in a clockwise direction.

For retrieving section dividers 100, deployment and retrieval system 400 forces section dividers in a positive x-axis (i.e., right direction) along storage guide rail 110. As motor drive 402 rotates in a counterclockwise direction, first pulley 406 coupled to motor drive 402 rotates linkage 404 resulting in second pulley 408 rotating in a counterclockwise direction. Linkage 404 translates the rotational force from second pulley 408 to third pulley 410, where third pulley 410 rotates in a counterclockwise direction. Linkage 404 translates the rotational force from third pulley 410 to fourth pulley 412, where fourth pulley 412 rotates in a clockwise direction. Linkage 404 translates the rotational force from fourth pulley 412 to fifth pulley 414, where fifth pulley 414 rotates in a counterclockwise direction.

Section divider carrier rail 206 includes actuator 416 to extend and retract section divider carrier rail 206 via rail extension 212 positioned within. As actuator 416 extends section divider carrier rail 206, a length of rail extension 212 being exposed from section divider carrier rail 206 increases. As actuator 416 retracts section divider carrier rail 206, a length of rail extension 212 being exposed from section divider carrier rail 206 decreases. Fifth pulley 414 is coupled to tensioner spring 418 which allows for fifth pulley 414 to move in both the positive and negative x-axis direction depending on whether deployment and retrieval system 400 is deploying or retrieving section dividers 100. In the illustrated extended state, distance 420 between fourth pulley 412 and fifth pulley 414 is at a minimum. The movement of spring tensioner 418 is described in further detail with regards to FIG. 4B.

Figure 4B:
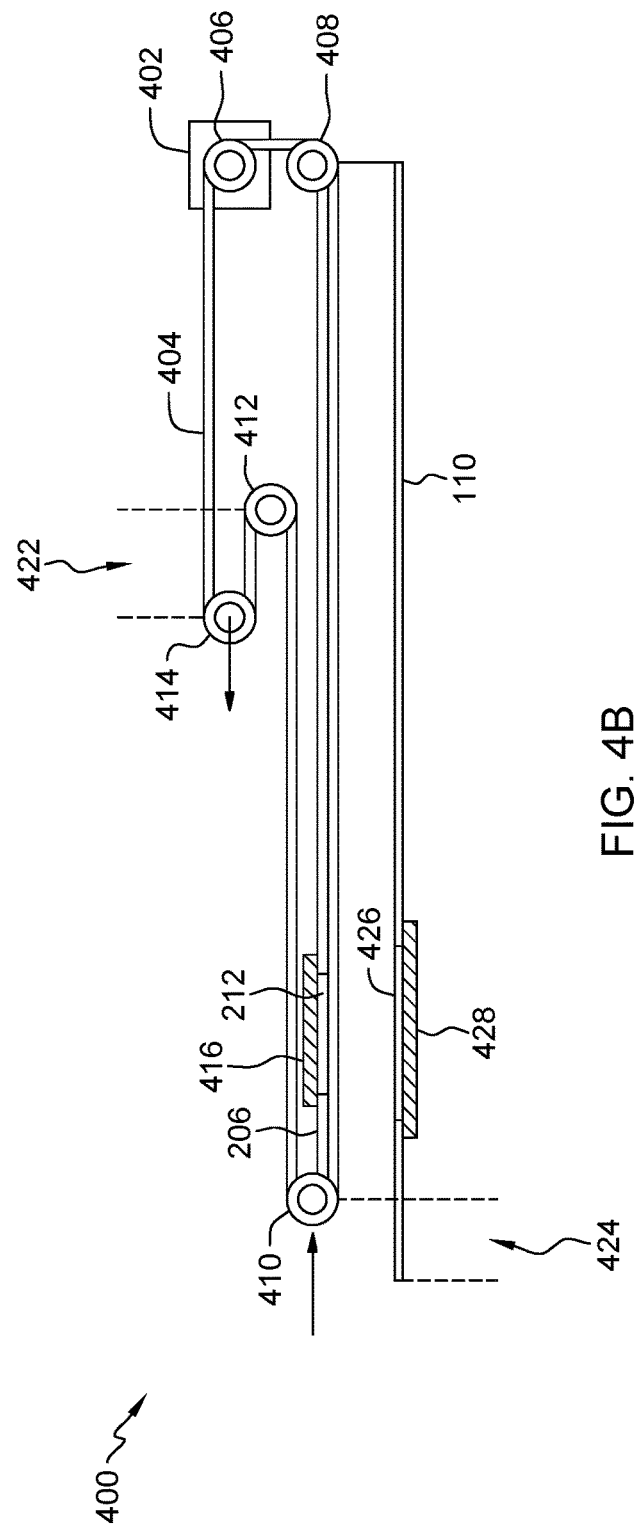
FIG. 4B depicts a side view of a deployment and retrieval system of a support chassis in a retracted state, in accordance with one embodiment of the present invention.

FIG. 4B depicts a side view of a deployment and retrieval system of a support chassis in a retracted state, in accordance with one embodiment of the present invention. For discussion purposes, FIG. 3B excludes section guides 306 and retrieval bodies 108 of section dividers 100 to simplify the illustration of deployment and retrieval system 400. As previously discussed in FIG. 3A, drive motor 402 is coupled to first pulley 406, where first pulley 406 drives second pulley 408, third pulley 410, fourth pulley 412, and fifth pulley 414 via linkage 404. As actuator 416 retracts section divider carrier rail 206, rail extension 212 retracts into section divider carrier rail 206 and a position of third pulley 410 moves in a negative x-axis direction (i.e., left direction). Distance 424 represents an amount deployment and retrieval system 400 retracts and is equal to a portion of rail extension 212 that retracts into section divider carrier rail 206. As third pulley 410 moves in the negative x-axis direction, tension in tensioner spring 418 is released and fifth pulley 414 moves in a positive x-axis direction (i.e., right direction). Tensioner spring 418 ensures that linkage 404 remains taut when deployment and retrieval system 400 is in either, a retracted state or an extended state. In this embodiment, storage guide rail 110 includes secondary guide rail extension 426 and guide actuator 428 for a lower portion of storage guide rail 110, where guide actuator 428 has the ability to operate in conjunction or independent of actuator 416.

Figure 5:
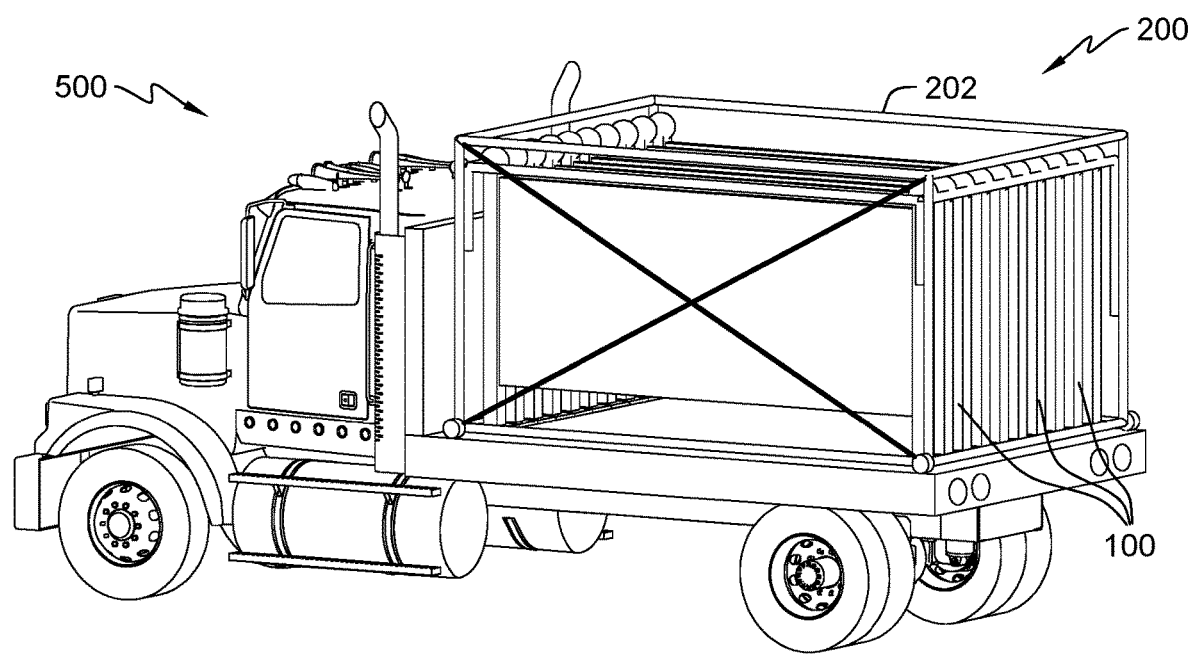
FIG. 5 depicts a support chassis with multiple flexible and rigid section dividers on a transport vehicle, in accordance with one embodiment of the present invention.

FIG. 5 depicts a support chassis with multiple flexible and rigid section dividers on a transport vehicle, in accordance with one embodiment of the present invention. In this embodiment, transport vehicle 500 includes support chassis 200, where frame 202 stores multiple section dividers 100. Support chassis 200 is configurable for loading and unloading onto transport vehicle 500, where transport vehicle has a loading floor capable of securing and supporting a weight of support chassis 200 and the multiple section dividers 100. In another embodiment, support chassis 200 is integrated into transport vehicle 500 such that supported chassis 200 is coupled to a mounting surface of transport vehicle 500.

Figure 6:
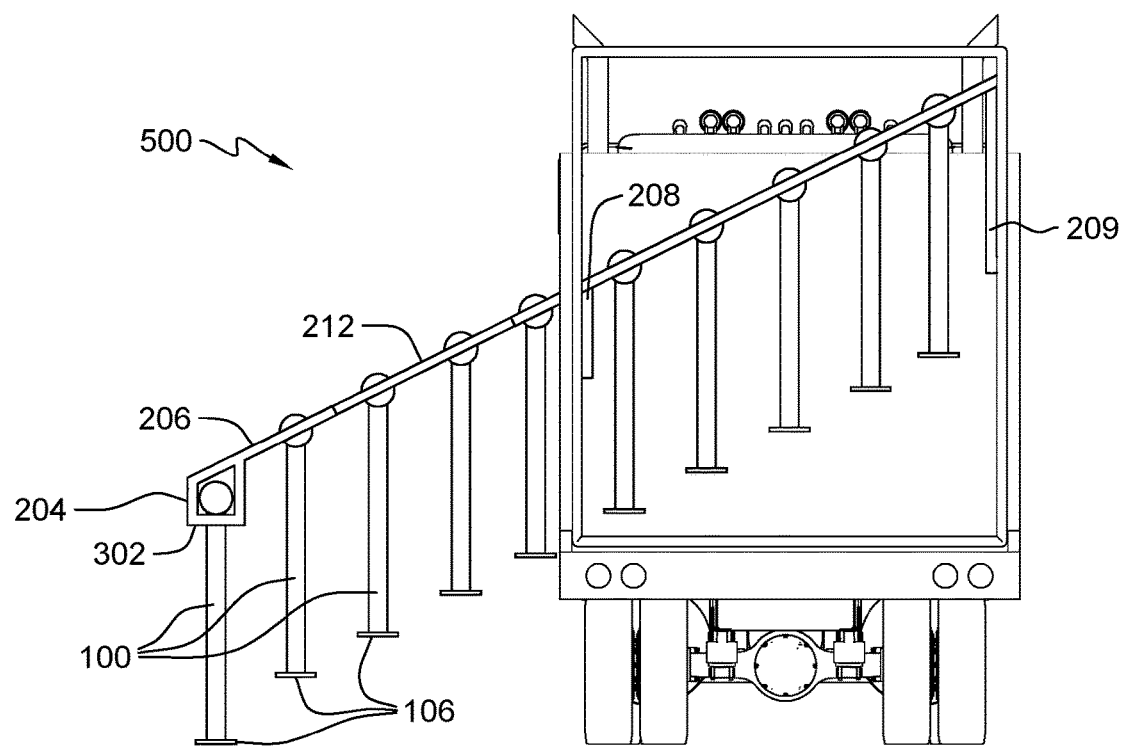
FIG. 6 depicts a side view of a support chassis with multiple flexible and rigid section dividers in an extended state, in accordance with one embodiment of the present invention.

FIG. 6 depicts a side view of a support chassis with multiple flexible and rigid section dividers in an extended state, in accordance with one embodiment of the present invention. In this embodiment, section divider carrier rails 206 are in an extended state, where rail extensions 212 are extending out of section divider carrier rails 206. As section divider carrier rails 206 extends, deployment rail 204 extends outside of transport vehicle 500. Platform 302 supports section divider 100 prior to deployment, where section divider 100 is deployed when base 106 contacts a surface and section divider 100 slides out of deployment rail. In this embodiment, section divider carrier rail 206 is in an extended state, where front actuator 208 is in a compressed state (i.e., negative y-axis direction) and rear actuator 209 is in an extended state (i.e., positive y-axis direction). In another embodiment, section divider carrier rail 206 is in a retracted state, where front actuator 208 is in an extended state (i.e., positive y-axis direction) and rear actuator 209 is in a compressed state (i.e., negative y-axis direction). Front actuator 208 and rear actuator 209 operate independently to allow for a varying surface height placement of each section divider 100 and/or to compensate for a varying height of each section divider 100.

The terminology used herein is for the purpose of describing particular embodiments only and is not intended to be limiting to the invention. As used herein, the singular forms "a", "an" and "the" are intended to include the plural forms as well, unless the context clearly indicates otherwise.

Having described preferred embodiments of a cooled containment compartment for package battery cells (which are intended to be illustrative and not limiting), it is noted that modifications and variations may be made by persons skilled in the art in light of the above teachings. It is therefore to be understood that changes may be made in the particular embodiments disclosed which are within the scope of the invention as outlined by the appended claims.

What is claimed is:

1. An apparatus for deployment and retrieval of section dividers, the apparatus comprising:
   a frame, a deployment rail, a first section divider carrier rail, and a second section divider carrier rail;
   a first end of the first section divider carrier rail coupled to a first end of the deployment rail and a first end of the second section divider carrier rail coupled to a second end of the deployment rail, wherein the first end of the deployment rail is opposite the second end of the deployment rail;
   a first actuator coupled to the first end of the first section divider carrier rail and a first portion of the frame;
   a second actuator coupled to the second end of the first section divider carrier rail and a second portion of the frame; and
   a first deployment and retrieval system coupled to the first section divider carrier rail, wherein the first deployment and retrieval system guides a first retrieval body at a first end of a first section divider from the deployment rail to the first section divider carrier rail.

2. The apparatus of claim 1, further comprising:
   a second deployment and retrieval system coupled to the second section divider carrier rail, wherein the second deployment and retrieval system guides a second retrieval body at a second end of the first section divider from the deployment rail to the second section divider carrier rail.

3. The apparatus of claim 2, further comprising:
a third actuator coupled to the first end of the second section divider carrier rail and a third portion of the frame; and
a fourth actuator coupled to the second end of the second section divider carrier rail and a fourth portion of the frame.

4. The apparatus of claim 2, wherein the deployment rail includes two or more cutouts for transferring the first section divider to the first section divider carrier rail and the second section divider carrier rail.

5. The apparatus of claim 2, the first deployment and retrieval system further comprising:
a first pulley coupled to a first motor drive, wherein the first pulley is coupled to a second pulley via a first linkage; and
a first set of one or more section guides coupled to the first linkage, wherein the first set of the one or more section guides directs the first retrieval body of the first end of the section divider from the deployment rail to the first section divider carrier rail.

6. The apparatus of claim 5, the second deployment and retrieval system further comprising:
a first pulley coupled to a second motor drive, wherein the first pulley is coupled to a second pulley via a second linkage; and
a second set of one or more section guides coupled to the second linkage, wherein the second set of one or more section guides directs the second retrieval body of the second end of the section divider from the deployment rail to the second section divider carrier rail.

7. The apparatus of claim 6, further comprises:
a first tensioner coupled to a third pulley of the first deployment and retrieval system, wherein the third pulley of the first deployment and retrieval system is coupled to the first pulley and the second pulley via the first linkage, wherein the first tensioner is in a relaxed position when the first rail extension is in an extended state.

8. The apparatus of claim 7, wherein the first tensioner is in a stretched position when the first rail extension is in a compressed state.

9. The apparatus of claim 8, further comprises:
a second tensioner coupled to a third pulley of the second deployment and retrieval system, wherein the third pulley of the second deployment and retrieval system is coupled to the first pulley and the second pulley via the second linkage, wherein the second tensioner is in a relaxed position when the second rail extension is in an extended state.

10. The apparatus of claim 9, wherein the tensioner is in a stretched position when the second rail extension is in a compressed state.

11. The apparatus of claim 6, wherein a dimension for each of the second set of one or more section guides is such that the second retrieval body is placeable in each of the second set of one or more section guides.

12. The apparatus of claim 5, wherein a dimension for each of the first set of one or more section guides is such that the first retrieval body is placeable in each of the first set of one or more section guides.

13. The apparatus of claim 2, wherein a dimension for each of the two or more cutout of the deployment rail are greater than a dimension of the first retrieval body and the second retrieval body of the first section divider.

14. The apparatus of claim 1, wherein the first section divider carrier rail includes a first rail extension disposed inside the first section divider carrier rail and the second section divider carrier rail includes a second rail extension disposed inside the second section divider carrier rail.

15. The apparatus of claim 14, further comprising:
a first actuator coupled to the first section divider carrier rail, wherein the first actuator extends the first section divider carrier rail exposing the first rail extension; and
a second actuator coupled to the second section divider carrier rail, wherein the second actuator extends the second section divider carrier rail exposing the second rail extension.

16. The apparatus of claim 1, further comprising:
one or more casters coupled to a lower surface of the frame, wherein the one or more casters allow for movement of the frame.

17. The apparatus of claim 1, wherein the first section divider is coupled to a second section divider.

18. The apparatus of claim 1, wherein the first section divider is a rigid structure and the second section divider is a flexible structure.

19. The apparatus of claim 17, wherein the first section divider is constructed from a material consisting of one or more of: a lightweight alloy, a plastic composite, and a ceramic composite.

20. The apparatus of claim 17, wherein the second section divider is of a woven plastic mesh material.

\* \* \* \* \*